United States Patent [19]

Wing

[11] Patent Number: 5,515,614
[45] Date of Patent: May 14, 1996

[54] DEVICE FOR SIMULTANEOUSLY MEASURING BOLT LENGTH AND DIAMETER

[76] Inventor: Jon P. Wing, 4415 Fox Creek Dr., Crystal Lake, Ill. 60012

[21] Appl. No.: 409,006

[22] Filed: Mar. 23, 1995

[51] Int. Cl.⁶ .................................................. G01B 3/34
[52] U.S. Cl. ............................... 33/548; 33/555.2; 33/562
[58] Field of Search .......................... 33/483, 484, 485, 33/501, 548, 555.1, 555.2, 562, 563, 565

[56] References Cited

U.S. PATENT DOCUMENTS

| | | | |
|---|---|---|---|
| 447,475 | 3/1891 | Pomeroy | 33/555.2 |
| 3,127,986 | 4/1964 | Hulka | 33/555.2 |
| 3,858,325 | 1/1975 | Goerler | 33/555.2 |
| 4,138,820 | 2/1979 | O'Connor | 33/555.2 |
| 5,131,162 | 7/1992 | Miller | 33/555.2 |
| 5,459,936 | 10/1995 | Stange | 33/563 |

Primary Examiner—William A. Cuchlinski, Jr.
Assistant Examiner—G. Bradley Bennett
Attorney, Agent, or Firm—Dorn, McEachran, Jambor & Keating

[57] ABSTRACT

A measuring device allows simultaneous determination of the length and diameter of elongated fasteners such as bolts, screws and the like. The device has a body member with a plurality of variously-sized holes extending from a gauge surface. The body member is preferably marked to indicate the hole size. A panel member is attached to or integral with the body and defines a plane extending parallel to the hole axes and spaced therefrom. The panel member carries indicia which indicate length from the gauge surface. Insertion of a bolt into the smallest hole which will accept it identifies the bolt diameter while comparing its end with the panel member indicia indicates its length.

11 Claims, 3 Drawing Sheets

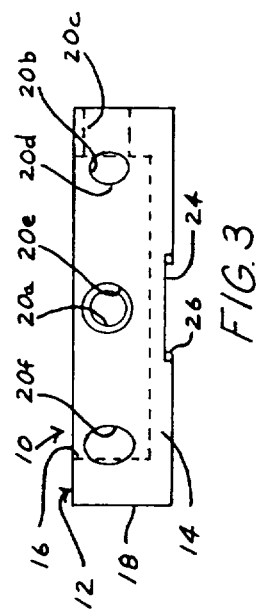
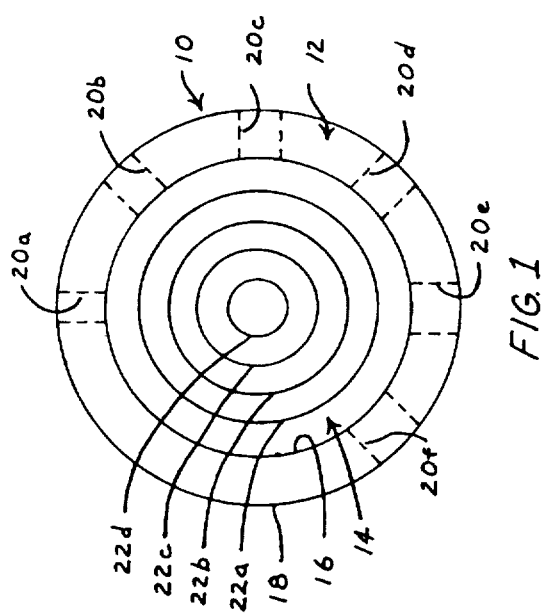
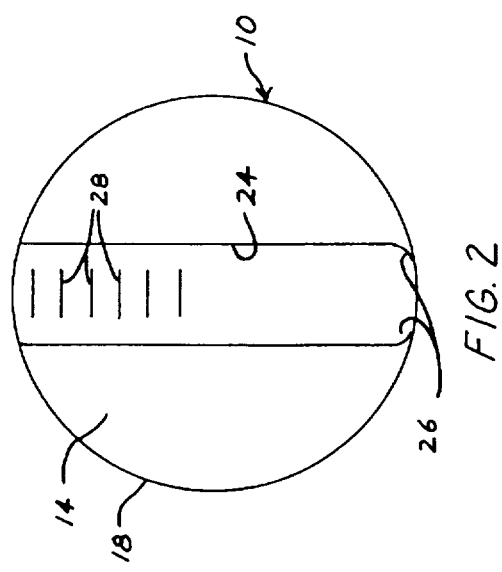

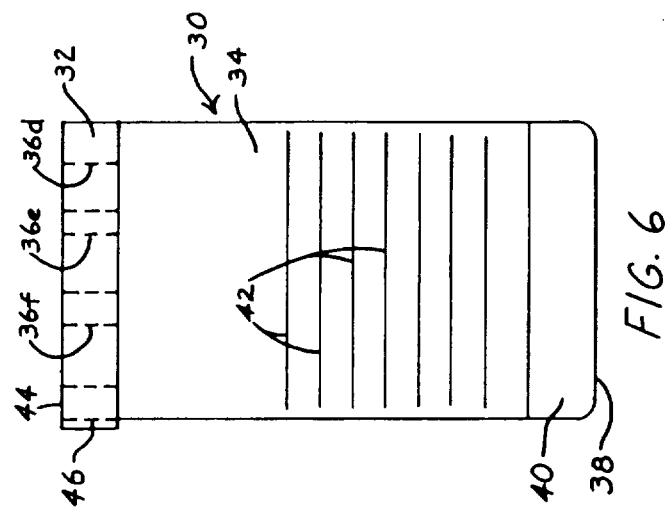
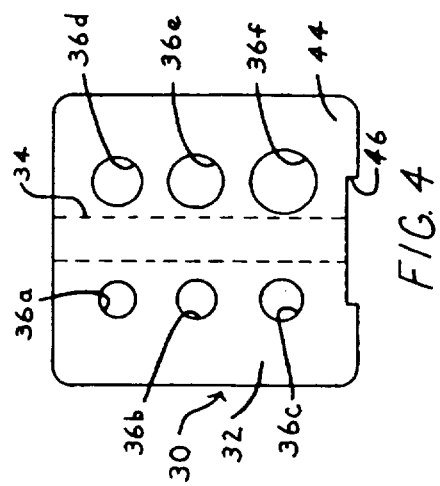
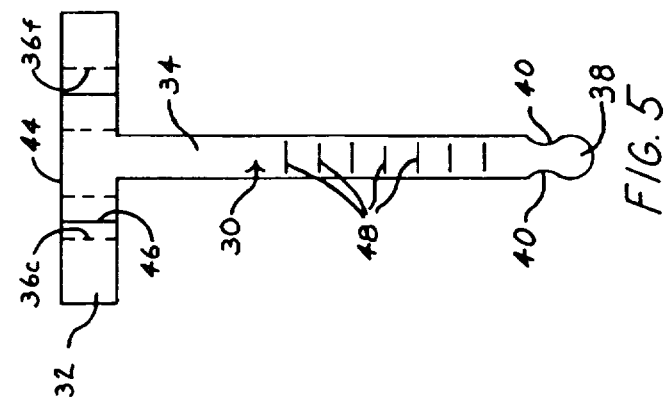

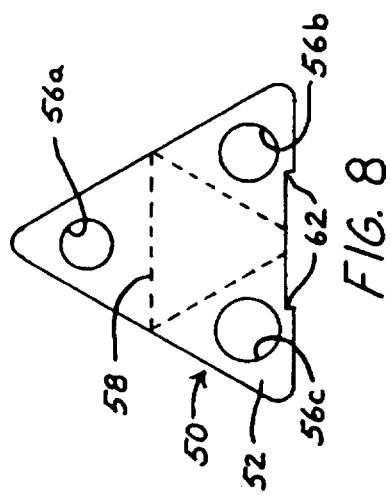
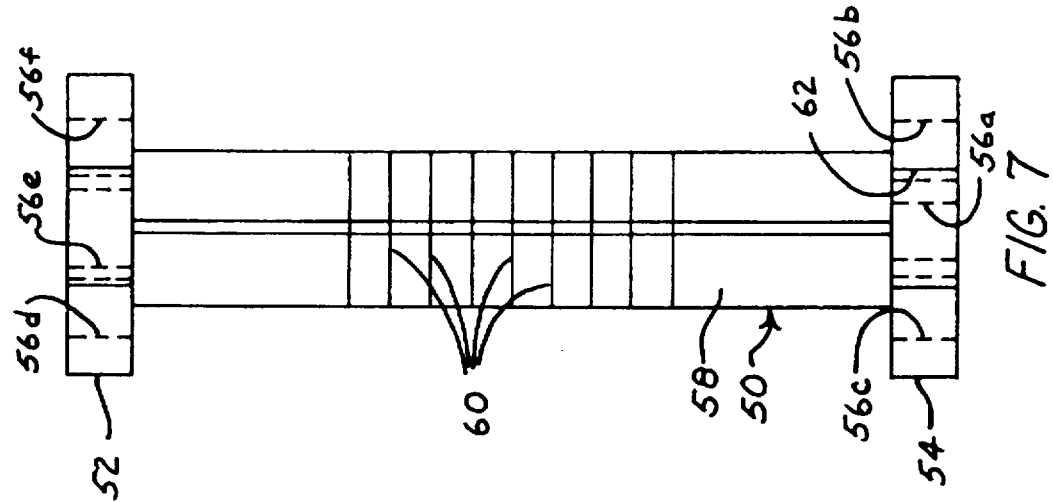

5,515,614

1

DEVICE FOR SIMULTANEOUSLY MEASURING BOLT LENGTH AND DIAMETER

SUMMARY OF THE INVENTION

This invention relates to a device for measuring length and diameter of elongated fasteners such as bolts, screw and the like. Various such devices or gauges are known in the art and they typically include a plate having a plurality of holes, one hole for each anticipated fastener diameter A separate length measuring device is provided somewhere on the plate, such as a rule or scale along one edge. After trying the bolt in the holes to find the diameter a second measurement is taken by laying the bolt along the ruled edge to determine the bolt length.

While this two-step approach is acceptable for some applications, others would benefit from a quicker, simpler method and apparatus for diameter and length determination. An example of an application where present measurement devices are deficient is within the medical industry. Surgeons, or their assistants, in the midst of a surgical procedure need to confirm quickly and accurately that assembled parts consisting of bolts, screws, plates, rods and coupling devices used during the surgical procedure or implanted in the patient are the correct size and length. The measuring device of the present invention fills this need for a quick, convenient measuring device. The device is simple in construction and therefore low in cost. It is practically self-evident how to use the invention and measurements of both diameter and length are made simultaneously in one step.

The measuring device of the invention comprises a body member having a plurality of holes therethrough. The holes have differing diameters corresponding to the expected diameters of the fasteners to be measured. A panel member is attached to or integral with the body member and extends in the direction of the axes of the holes. The panel member has indicia marked thereon for indicating the distance from a gauge surface of the body member. When a bolt (or other item to be measured) is placed in the smallest hole which will accommodate it, indicia associated with the hole will indicate the diameter while the indicia on the panel member will simultaneously indicate the length.

BRIEF DESCRIPTION OF THE DRAWINGS

FIG. 1 is a top plan view of the measuring device of the present invention.

FIG. 2 is a bottom plan view of the measuring device.

FIG. 3 is a side elevation view of the device of FIG. 1.

FIG. 4 is a top plan view of an alternate embodiment of the measuring device.

FIG. 5 is an end elevation view of the device of FIG. 4.

FIG. 6 is a side elevation view of the device of FIG. 4.

FIG. 7 is a side elevation view of a further alternate embodiment of the measuring device.

FIG. 8 is a bottom plan view of the device of FIG. 7.

DETAILED DESCRIPTION OF THE INVENTION

A first embodiment of the measuring device 10 is shown in FIGS. 1–3. The device 10 comprises two main components, a body member 12 and a panel member 14. In this embodiment the body member is a cylindrical ring having an inside wall 16 and an outside wall 18. The panel member 14 is a disc-shaped plate that closes the bottom end of the cylindrical ring. Together the inside wall 16 and panel member 14 define a cavity in the interior of the device. The measuring device is preferably molded of suitable plastic material, although other materials could be used.

A plurality of holes 20a–20f extend through the body member. Each hole has a different diameter which corresponds to an anticipated diameter of the fasteners to be measured. By corresponding-it is meant that the hole diameter is such that the hole will snugly receive a fastener shank of a certain diameter while not requiring appreciable force to get the shank to slide in. Accordingly, the actual diameter of the hole may include some clearance to allow the shank to fit into the hole and thus the hole diameter may be somewhat greater than the nominal bolt size. Furthermore, while six holes 20 are shown, it will be understood that there may be as many holes as spacing permits. Each of the holes 20 defines its own axis. The axes of all the holes are in a parallel plane which is spaced somewhat above the panel member 14, as seen in FIG. 3. The holes are preferably radial with respect to the cylinder defined by the body member 12.

The upper surface of the panel member has a plurality of circular indicia 22a–22d formed or marked thereon. The indicia 22 are concentric with the body member 12 and are located at a specified distance from a gauge surface on the body member. The gauge surface in this embodiment is the outer wall 18. The indicia may take the form of depressed grooves, slightly upraised ridges, painted markings, decals or other suitable means for indicating a distance from the gauge surface. While not shown in the drawings, the indicia may typically include numbers associated with the lines to identify the values of the lines in inches, millimeters or whatever. Similarly, markings may be associated with the holes 20 to identify what size each hole is.

The use of the measuring device is as follows. The bolt, screw or other fastener to be measured is passed through the smallest hole 20 that will accept it. The bolt is fully inserted into the hole until the head of the bolt abuts the outer wall 18. The tip end of the bolt extends into the cavity and is adjacent one of the indicia 22 which will indicate the length while the hole size indicia reports the bolt diameter. Both measurements can be read with only a single placement of the bolt on or in the measuring device.

An optional scale for non-cylindrical shapes is formed on the bottom or underside of the panel member 14. Looking at FIGS. 2 and 3, the scale comprises a shallow groove 24 extending across the diameter of the panel member. The edges of the groove at one end blend or merge at 26 with the outer wall 18. The blend lines help retain a part being measured in the groove. Calibrated length indicia 28 are placed in the bottom of the groove. This scale is used for determining the length of oversized cylindrical fasteners or parts of non-cylindrical cross section that would not fit through the holes 20. An example is the plates used in orthopedic surgery. These typically have a rectangular cross section. To use the scale one lays the fastener in the groove and aligns one end of the fastener with the outer wall 18 opposite the blend lines 26. The length is read off of the indicia 28.

An alternate embodiment of the invention is shown at 30 in FIGS. 4–6. In this version the body member 32 is a rectangular, generally flat plate. The panel member 34 is also a flat plate, extending perpendicular to the body member 32. Holes 36a–36f extend through the body member, on either side of the panel member. The panel has a rounded tip 38 adjacent indentations 40 which are provided to make it easier to grip the device. Indicia as at 42 on both of the wide faces of the panel member provide a length scale. The top face 44 of the body member is the gauge surface. A notch 46 in one edge of the body member may be used together with indicia 48 for length measurements of non-cylindrical shapes. The use of measuring device 30 is similar to that of FIGS. 1–3 in that a fastener is placed through the smallest hole 36 possible until the head engages gauge surface 44. The length is then read off of indicia 42 while the marking associated with the hole provides the diameter.

A second alternate embodiment of the invention is shown at 50 in FIGS. 7 and 8. This measuring device has first and second body members 52 and 54. These are triangular, flat plates having a plurality of holes 56a–56f in the vicinity of the corners of the triangles. A triangular panel member 58 joins the two body members. The three flat faces of the panel member 58 have markings 60 thereon for indicating length. In this embodiment there are two gauge surfaces, one on the outside face of each body member. The marks 60 indicate distances from each of these gauge surfaces and therefore will have two numeric value indicators associated with each mark. A notch 62 can be used for non-cylindrical shapes.

While a preferred form of the invention has been shown and described, it will be realized that alterations and modifications may be made thereto without departing from the scope of the following claims. For example, the body member in FIGS. 1–3 could be made of transparent material with the indicia marked on the surface. Thus, instead of having a cavity, the device could be a solid disc except for the holes. The tip of the fastener could be seen through the disc and compared to the indicia on the surface of the disc. The panel member in this case would be the top surface of the disc.

I claim:

1. A device for simultaneously measuring shank length and diameter, comprising:

a body member defining a gauge surface and having a plurality of variously-sized holes therethrough, each hole defining an axis perpendicular to the gauge surface and having a diameter corresponding to a possible diameter of a shank to be measured; and a panel member connected to the body member and defining at least one face having indicia thereon at specified distances from the gauge surface, the face defining a plane which is parallel to and spaced from the axes of the holes.

2. The device of claim 1 wherein the body member defines a cylinder, with the panel member closing one end of the cylinder and the holes being radially-directed.

3. The device of claim 2 wherein the gauge surface is the outside wall of the cylinder defined by the body member.

4. The device of claim 2 further comprising a diametral groove cut in the panel member and having indicia therein.

5. The device of claim 1 wherein the body member is a generally flat plate.

6. The device of claim 5 further comprising a notch cut in one edge of the body member.

7. The device of claim 5 wherein the panel member is a generally flat plate disposed perpendicularly to the panel member.

8. The device of claim 5 wherein the panel member is a generally triangular column disposed perpendicularly to the panel member.

9. The device of claim 8 wherein the body member is triangular.

10. The device of claim 8 further comprising a second body member attached to the column.

11. The device of claim 5 wherein the panel member is a generally flat plate disposed perpendicularly to the panel member, the flat plate having an edge aligned with a notch cut in the body member, the edge having indicia thereon at specified distances from the gauge surface.

* * * * *